June 9, 1925.  
J. VON WALDY  
1,540,825  
PNEUMATIC SPRING SUSPENSION  
Filed May 1, 1924
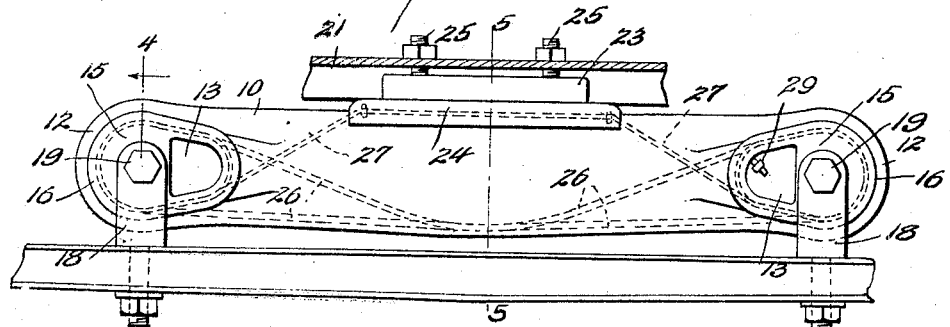
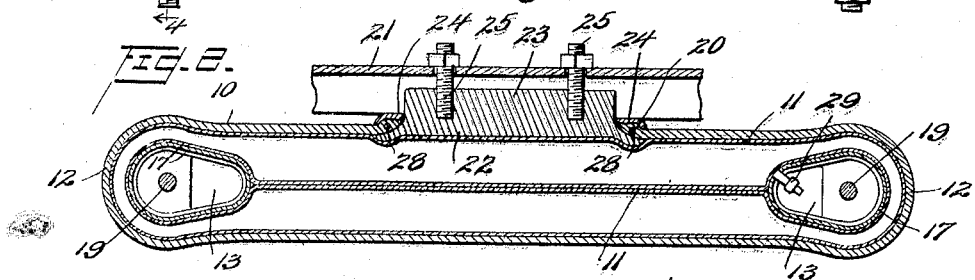
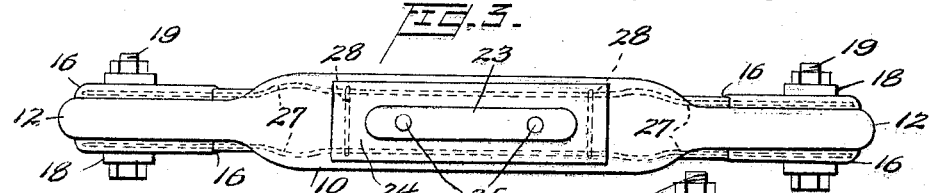
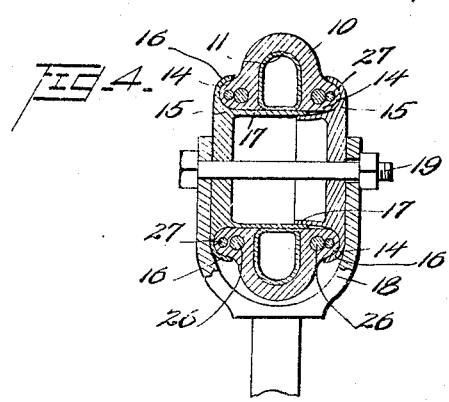
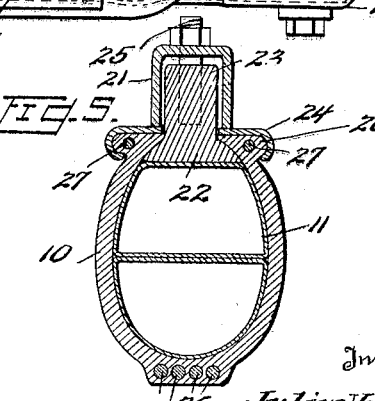
Inventor  
Julius Von Waldy  
By Emery, Booth, Janney & Varney  
Attorney Patented June 9, 1925.

1,540,825

UNITED STATES PATENT OFFICE.

JULIUS VON WALDY, OF NEW YORK, N. Y.

PNEUMATIC SPRING SUSPENSION.

Application filed May 1, 1924. Serial No. 710,445.

*To all whom it may concern:*

Be it known that I, JULIUS VON WALDY, a resident of New York, in the county of New York and State of New York, have invented an Improvement in Pneumatic Spring Suspensions, of which the following description, in connection with the accompanying drawings, is a specification, like characters on the drawings representing like parts.

My invention aims to provide an improved spring suspension for vehicles, particularly adapted to automobiles of a well known type and the subject matter of this application constitutes an improvement on the construction shown in my co-pending application entitled "Spring suspension".

In the accompanying wherein I have shown one embodiment of my invention selected for illustrative purposes;

Fig. 1 is a front elevation of a portion of a vehicle showing my invention applied thereto;

Fig. 2 is a longitudinal, central, vertical section of the pneumatic spring shown in Fig. 1, showing one form of the attaching means;

Fig. 3 is a top plan view of the device shown in Fig. 1;

Fig. 4 is a vertical section taken on the line 4—4 of Fig. 1; and,

Fig. 5 is a fragmentary vertical section taken on the line 5—5 of Fig. 1.

Referring more particularly to the drawings, I have shown my improved pneumatic spring as comprising an elongated pneumatic casing 10 constituting an elastic beam having means provided adjacent the ends of the casing and at its central region for securing it to parts of the vehicle, such as the axle and the frame. Also, my invention contemplates the provision of an inner tube 11 adapted to be inserted in the casing from either end as desired.

Referring to Fig. 1, I have shown the casing 10 as having, for convenience, continuous walls with top and side openings and closed ends 12. The casing is provided, adjacent the ends, with means for attaching it to the vehicle axle. To this end opposed openings 13 of any desired shape are preferably provided in the opposite side walls of the casing and are surrounded by reenforced beads 14 to afford means for securing supporting plates or rims 15 rigidly on the casing. As shown in Fig. 4 the plates 15 have bead embracing flanges 16 and tubular projections 17 adapted to enter the respective openings preferably telescoping one within the other and extending from one wall to the other. Suitable brackets 18, preferably fork-shaped, as shown in Fig. 4, are adapted to be secured to the supporting plates or rims 15 by means of bolts 19 or other suitable securing devices. These brackets may have any suitable means, such as bolt ends, for securing them rigidly to the axle (see Fig. 1).

At the top of the casing between its ends I have shown another opening of sufficient size to permit withdrawal of the cores necessary for making the casing. On the opposite sides of the opening strengthening beads 20 are also preferably provided. The securing means for connecting this portion of the casing to the vehicle frame 21 preferably comprises a suitable attaching and closure plate 22 underlying the beads 20 somewhat in the manner of a hand-hole closure plate. This plate preferably has an integral projection or rib 23 adapted to be attached to the vehicle frame 21 in any convenient manner. As shown, the projection or rib is inserted in a channel beam of the frame 21. On the top of the casing around the opening I have shown a continuous metal rim 24 on which the frame or channel beam 21 may rest, thus preventing cutting of the casing wall. As shown in Fig. 5, this plate is curled over the beads 20 so as to prevent lateral spreading of the casing walls on opposite sides of the opening. As shown in Fig. 2 the projection 23 is bolted or otherwise secured to the web of the channel 21 as by the stud bolts 25, so that the rim 24 is securely clamped on the bead 20 between the closure plate and the frame.

The casing constitutes a flexible beam and is constructed of sufficient strength to withstand shocks and jars due to hard usage. Preferably it is provided with suitable tension elements which may advantageously be disposed on opposite sides of the longitudinal walls of the casing. For this purpose metal cables 26 or other suitable tension elements are preferably disposed around the tubular projections of the supporting plates 15 and are imbedded in the casing wall. As shown in Fig. 1, each of the cables 26 is continuous and arranged in loops surrounding the inner extensions of the supporting plates, and intermediate the ends of the casing, preferably at its middle, the stretches of both of the cables are associated with the bottom wall so that they constitute suspension elements adapted to resist downward flexure of the beam and to carry a part of the load.

To provide suitable reenforcing means to prevent undue upward flexure or recoil of the beam, and to provide for lateral stability of the vehicle, I have shown tension elements 27, also preferably of metal cable, imbedded in and partially surrounding the walls of the casing. In the preferred embodiment of my invention these cables 27 also constitute the reenforcing elements for the beads surrounding the openings. As shown in Fig. 1, each of the cables 27 preferably is looped at each end and imbedded in the beads 14. The intermediate stretch extends from the beads 14 upwardly along and partially around the casing wall through the bead at one side of the opening in the top wall, thus forming the reenforcement for that bead also. Beyond the ends of the opening in the top walls the cables 27 are preferably tied together by suitable metal clips 28 or other convenient tying devices so as to prevent lateral spreading thereof. Thus, the cables 27 constitute tension elements to prevent undue upward flexure of the beam and also provide the necessary reenforcing elements for the beads. Due to the arrangement of the cables, rocking or swaying of the vehicle laterally is eliminated, thereby absorbing the momentum tending to turn the vehicle over in turning curves.

The inner tube 11 preferably has end portions which surround the tubular extensions 17 of the end plates 15. The inner tube may, for convenience, be somewhat similar to that employed in bicycles and the like, and the valve stem 29 preferably projects through one of the tubular projections 17. If it is desired to remove the inner tube for repairs, each of the supporting plates 15 may be removed and the tube pulled out of one of the openings.

From the foregoing description it will be observed that my improved pneumatic beam, provided as it is with suitable tension elements, is particularly adapted for use in automobiles and the like. Any shocks and jars to which such vehicles are subjected will be readily absorbed by the pneumatic casing without causing objectionable vibration of the automobile body. Also my improved suspension may easily be substituted for such springs as are commonly used in automobiles of a well known type without necessitating any alterations of the axle or the chassis.

My invention is not limited to the particular illustrative embodiment herein disclosed.

What I claim and desire to secure by Letters Patent is:

1. A vehicle spring comprising a pneumatic beam having rigid securing means adjacent the ends and securing means intermediate its ends for connection to the vehicle frame and to the running gear, means associated with the beam for resisting downward flexure and means for resisting undue upward flexure of the beam.

2. A vehicle spring comprising a pneumatic beam secured near its ends to the vehicle axle and between its ends to the vehicle frame and means associated with the beam for resisting undue upward flexure due to rebound.

3. A vehicle spring comprising a pneumatic beam secured near its ends to the vehicle axle and between its ends to the vehicle frame, the top wall of said beam being rigidly supported for a portion of its length and tension elements imbedded in the beam associated with the rigid portion of the top wall and arranged to resist lateral sway of the vehicle.

4. A vehicle spring comprising an inflatable elongated casing having opposed openings in its side walls adjacent the ends, means insertible in said openings having provision for supporting said casing upon the vehicle axle and means for securing the casing between its ends to the vehicle frame.

5. A vehicle spring comprising an elongated pneumatic casing closed at both ends and having opposed openings in the side walls adjacent the ends, securing plates over said openings having tubular projections passing through said casing, brackets for securing said plates to the vehicle axle and means for connecting the casing between the ends to the vehicle frame.

6. A spring for vehicles comprising a pneumatic beam having transverse openings near its ends, means in said openings having provision for securing the beam to the vehicle running gear and means for securing the beam to the vehicle chassis.

7. A spring for vehicles comprising a pneumatic beam having transverse openings near its ends, securing plates having tubular extensions telescoped together within said openings, brackets on the vehicle axle secured to said plates for supporting the beam rigidly on the axle and means for securing the beam to the vehicle frame.

8. A spring for vehicles comprising a pneumatic beam having transverse openings near its ends, securing plates having tubular extensions telescoped together within said openings, fork-shaped brackets on the vehicle axle secured to said plates and adapted to maintain said tubular extensions in telescopic engagement, and means for securing said beam rigidly to the vehicle frame.

9. A vehicle spring comprising an elongated pneumatic casing of flexible material closed at its ends, transverse openings near the ends, the walls of said casing adjacent the openings having reenforced beads, securing plates engaging said beads and having extensions in said openings, means for securing the casing between the ends to the vehicle frame and reenforcing elements in said beads extending along the casing wall adapted to resist upward flexure of the casing on the rebound of the vehicle and means to prevent downward flexure of the casing.

10. A spring for vehicles comprising an elongated pneumatic casing having transverse openings adjacent its ends, beads in the casing adjacent said openings, securing plates over said beads providing means for attaching the casing to the vehicle, said casing between its ends having an elongated opening and a securing plate in said opening, also providing means for attaching the casing to a portion of the vehicle, beads adjacent said elongated opening and reenforcing cables associated with the side walls of the casing and said beads adapted to resist flexure of the casing in one direction and to resist lateral swaying of the vehicle.

11. A vehicle spring comprising a pneumatic beam having transverse openings adjacent the ends, beads in the walls adjacent the openings, securing plates having tubular extensions in said openings, securing brackets for said plates, means for attaching the beam between the ends to a portion of the vehicle, tension reenforcing elements partly encircling the walls of the beam on opposite sides extending upwardly from the beads toward the top wall of the beam and extending around said beads, and tension elements imbedded in the walls of the beam around said extensions of the securing plates and extending downwardly toward the bottom wall of the beam between the ends, said tension elements adapted to resist downward and upward flexure of the beam.

12. A spring for vehicles comprising an elongated pneumatic casing secured at its ends to the vehicle axle and between the ends to the vehicle frame, tension cables in the opposite side walls of the casing extending upwardly from near the bottom at the ends toward the top wall midway between the ends and means tying said cables together near the top wall of the casing to prevent spreading out of said tension cables adapted to resist lateral sway of the vehicle.

13. A spring for vehicles comprising a pneumatic casing secured at its ends to the vehicle axle and presenting an elongated opening in the top wall between the ends, the casing adjacent the opening having an external bead, a closure plate within the casing having its edges underlying said bead and presenting means extending through said opening for securing the casing to the vehicle frame and a flanged rim overlying and engaging said bead adapted to support the vehicle frame on the casing, said rim being clamped upon said bead between the vehicle frame and said closure plate 14. A vehicle spring comprising an elongated pneumatic beam secured near each end and between the ends to the vehicle and reenforcing means associated therewith to resist lateral sway of the vehicle.

15. A vehicle spring comprising an elongated pneumatic casing having continuous side and end walls and separated connecting devices for attaching said casing to the vehicle so arranged that the casing constitutes an elastic beam suspension.

16. A vehicle spring comprising the elongated casing 10 having the inflatable inner tube 11 therein, securing plates 15 adjacent the ends of the casing, brackets 18 on the vehicle axle connected to the securing plates, the securing plate 22 in the top wall of the casing connected to the vehicle frame and the tension elements 26 and 27 associated with the casing walls, all substantially as shown and described.

In testimony whereof, I have signed my name to this specification.

JULIUS VON WALDY.